United States Patent
Fillep et al.

(10) Patent No.: US 11,950,532 B2
(45) Date of Patent: Apr. 9, 2024

(54) MOWER COMBINATION WITH LOCATION BASED CONVEYOR CONTROL

(71) Applicant: AGCO International GmbH, Neuhausen (CH)

(72) Inventors: Johannes Fillep, Feucht (DE); Ronnie Kinast, Ilschwang (DE)

(73) Assignee: AGCO International GmbH, Neuhausen (CH)

( * ) Notice: Subject to any disclaimer, the term of this patent is extended or adjusted under 35 U.S.C. 154(b) by 370 days.

(21) Appl. No.: 17/128,056

(22) Filed: Dec. 19, 2020

(65) Prior Publication Data

US 2021/0185927 A1    Jun. 24, 2021

(30) Foreign Application Priority Data

Dec. 19, 2019   (GB) ..................................... 1918843

(51) Int. Cl.
*A01D 57/20*   (2006.01)
*A01D 34/00*   (2006.01)
(Continued)

(52) U.S. Cl.
CPC ........... *A01D 57/20* (2013.01); *A01D 34/008* (2013.01); *A01D 34/667* (2013.01);
(Continued)

(58) Field of Classification Search
CPC .... A01D 57/20; A01D 34/008; A01D 34/667; A01D 43/077; A01D 57/30
See application file for complete search history.

(56) References Cited

U.S. PATENT DOCUMENTS

| 4,185,445 A * | 1/1980 | van der Lely ....... A01D 43/107 |
| | | 56/192 |
| 6,070,673 A * | 6/2000 | Wendte .................. G01C 21/20 |
| | | 701/50 |

(Continued)

FOREIGN PATENT DOCUMENTS

| DE | 102008058281 A1 * | 5/2010 | ........... A01D 75/303 |
| EP | 1 306 000 A1 | 5/2003 | |

(Continued)

OTHER PUBLICATIONS

Lehner_DE_102008058281_A1 _-_English_translation—May 27, 2010.*

(Continued)

*Primary Examiner* — Thomas B Will
*Assistant Examiner* — Julia C Tran

(57) ABSTRACT

A mower combination having an agricultural vehicle and a number of mowing units suitable for cutting a standing crop connected to the agricultural vehicle, including a front mowing unit and two lateral mowing units located behind and to the sides of the front mowing unit, each of the lateral mowing units being provided with conveyor units to deposit cut crop as a swath. A control unit receives a plurality of signals, representing the location of the mower combination, a displacement of each of the conveyor units and/or a direction of operation of each of the conveyor units. The control unit receives the plurality of signals and compares them against a predetermined set of values and as required adjusts the displacement or direction of operation of at least one conveyor unit based on this comparison.

8 Claims, 4 Drawing Sheets

(51) Int. Cl.
*A01D 34/66* (2006.01)
*A01D 43/077* (2006.01)
*A01D 57/30* (2006.01)
*A01D 101/00* (2006.01)

(52) U.S. Cl.
CPC ........... *A01D 43/077* (2013.01); *A01D 57/30* (2013.01); *A01D 2101/00* (2013.01)

(56) References Cited

U.S. PATENT DOCUMENTS

| | | | | |
|---|---|---|---|---|
| 6,128,574 | A * | 10/2000 | Diekhans | G05D 1/0278 701/410 |
| 6,205,381 | B1 * | 3/2001 | Motz | A01B 69/008 701/25 |
| 6,508,050 | B1 * | 1/2003 | Krone | A01D 43/107 56/192 |
| 6,971,225 | B1 * | 12/2005 | Kempf | A01D 57/20 56/398 |
| 9,668,418 | B2 * | 6/2017 | Patton | A01D 41/1243 |
| 2001/0003239 | A1 | 6/2001 | Franet | |
| 2003/0024228 | A1 * | 2/2003 | Franet | A01D 43/077 56/192 |
| 2004/0200203 | A1 * | 10/2004 | Dow | A01B 73/02 56/375 |
| 2005/0252183 | A1 * | 11/2005 | Hironimus | A01D 75/30 56/6 |
| 2005/0273253 | A1 * | 12/2005 | Diekhans | G01C 21/20 701/50 |
| 2006/0200294 | A1 * | 9/2006 | Scheufler | A01B 79/005 701/41 |
| 2017/0280627 | A1 * | 10/2017 | Treffer | A01D 82/02 |
| 2018/0325031 | A1 * | 11/2018 | Rotole | A01D 43/102 |
| 2018/0332771 | A1 | 11/2018 | Digman | |

FOREIGN PATENT DOCUMENTS

| | | |
|---|---|---|
| EP | 2042025 A | 4/2009 |
| EP | 2 529 614 A1 | 12/2012 |
| EP | 3 400 780 A1 | 11/2018 |
| EP | 3 400 782 A1 | 11/2018 |
| WO | 03/079761 A1 | 10/2003 |

OTHER PUBLICATIONS

European Patent Office, Search report prepared for related EP Application No. EP20 214 903.5, dated May 19, 2021.
UK Intellectual Property Office, Search report prepared for UK priority Application No. GB1918843.2, dated Jun. 17, 2020.

* cited by examiner

MOWER COMBINATION WITH LOCATION BASED CONVEYOR CONTROL

CROSS REFERENCE TO RELATED APPLICATION

This application claims the benefit of U.K. Application No. GB 1918843.2, filed Dec. 19, 2019, which is hereby incorporated by reference in its entirety.

BACKGROUND

Field

The present invention relates to a mower combination comprising an agricultural vehicle and a number of mowing units suitable for generating swathes of cut crop, and in particular to a mowing apparatus for cutting a standing crop such as hay.

Description of Related Art

It is known to provide a mower combination in which a first mower unit is located ahead of an agricultural vehicle such as a tractor with two further lateral mowing units trailing the agricultural vehicle. The rear mowing units are provided with conveyor units for depositing cut crop into a swath or swathes behind the agricultural vehicle.

It is known for an operator to adjust the conveyors units to change the configuration of the swaths produced, for example to change from a single broad triple width swath to a double width swath accompanied by a single width swath or to a set of three single width swaths (and to have different spacings of such single width swaths depending upon the operation of the conveyor units). In the case of a first journey producing a double width swath accompanied by a single width swath, it will be understood that a second return journey will produce a set of three double width swaths.

For example depending upon the subsequent treatment of the cut crop different widths of swath may be appropriate. It may be that a loader wagon will collect cut crop from a broader swath, but that a baler requires a narrower swath. Thus an operator will wish to control the swath pattern produced for each set of cut crop to be processed.

However, the need to constantly monitor and adjust the settings of the conveyor units to produce multiple swaths of the desired configurations throughout the working of multiple fields of varying shapes and sizes is stressful and tiring for the operator of the mower combination.

SUMMARY

According to a first aspect of the present invention, a mower combination comprises an agricultural vehicle and a number of mowing units suitable for cutting a standing crop connected to the agricultural vehicle, including a front mowing unit and two lateral mowing units located behind and to the sides of the front mowing unit, each of the lateral mowing units being provided with conveyor units to deposit the cut crop as a swath, the mower combination further comprising a control unit receiving a plurality of signals, the signals representing the location of the mower combination, a displacement of each of the conveyor units and a direction of operation of each of the conveyor units, the control unit being configured to receive the plurality of signals and compare the signals for the location of the mower combination, the displacement of the conveyor units and/or the direction of operation of the conveyor units against a predetermined set of values and as required to adjust the displacement or direction of operation of at least one conveyor unit based on this comparison.

This has as an advantage that the operator no longer needs constantly to monitor the operation of the conveyor units thereby reducing the stress and tiredness of the operator.

Preferably, the predetermined set of values includes a desired track line and desired displacement or direction of operation of each conveyor unit.

Preferably the conveyor units comprise conveyor belts or conveyor screws.

Preferably, the mower combination further comprises a user terminal coupled to the control unit, the user terminal providing feedback to an operator of the adjustment of the displacement or direction of operation of the at least one of the conveyor units.

Preferably the user terminal is used to provide the desired predetermined values for the displacement of the conveyor units and the direction of operation of the conveyor units in relation to the location of the mower combination.

According to second aspect of the invention, a method of operation of a mower combination in accordance with the first aspect of the invention comprises providing a predetermined set of values to the control unit, monitoring the location of the mower combination, the displacement of each of the conveyor units and a direction of operation of each of the conveyor units and providing signals representative of the location of the mower combination and the direction of operation of the conveyor units to the control unit, the control unit comparing the signals representing the location of the mower combination, the displacement of each of the conveyor units and the direction of operation of the conveyor units against the predetermined set of values and as required signalling at least one conveyor unit to adjust the displacement or the direction of operation of the at least one conveyor unit based on this comparison.

Preferably, the step of providing the predetermined set of values to the control unit is performed by an operator entering the predetermined set of values into the user terminal.

Alternatively, the step of providing the predetermined set of values to the control unit is performed by an operator entering the predetermined set of values into a remote computing device in communication with the control unit.

Alternatively, the step of providing the predetermined set of values to the control unit is performed by an operator entering a first set of the predetermined set of values into a remote computing device in communication with the control unit and a second set of the predetermined set of values into the user terminal.

According to a third aspect of the invention, a computer implemented method comprises the steps of a control unit receiving a plurality of signals, the signals representing the location of the mower combination, a displacement of each of the conveyor units and a direction of operation of each of the conveyor units, the control unit being configured to receive the plurality of signals and compare the signals for the location of the mower combination and the displacement and/or direction of operation of each conveyor unit against a predetermined set of values and as required to adjust the displacement or direction of operation of at least one conveyor unit based on this comparison.

According to a fourth aspect of the present invention, a computer readable program comprises instructions that causes one or more processors to implement the method of the third aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
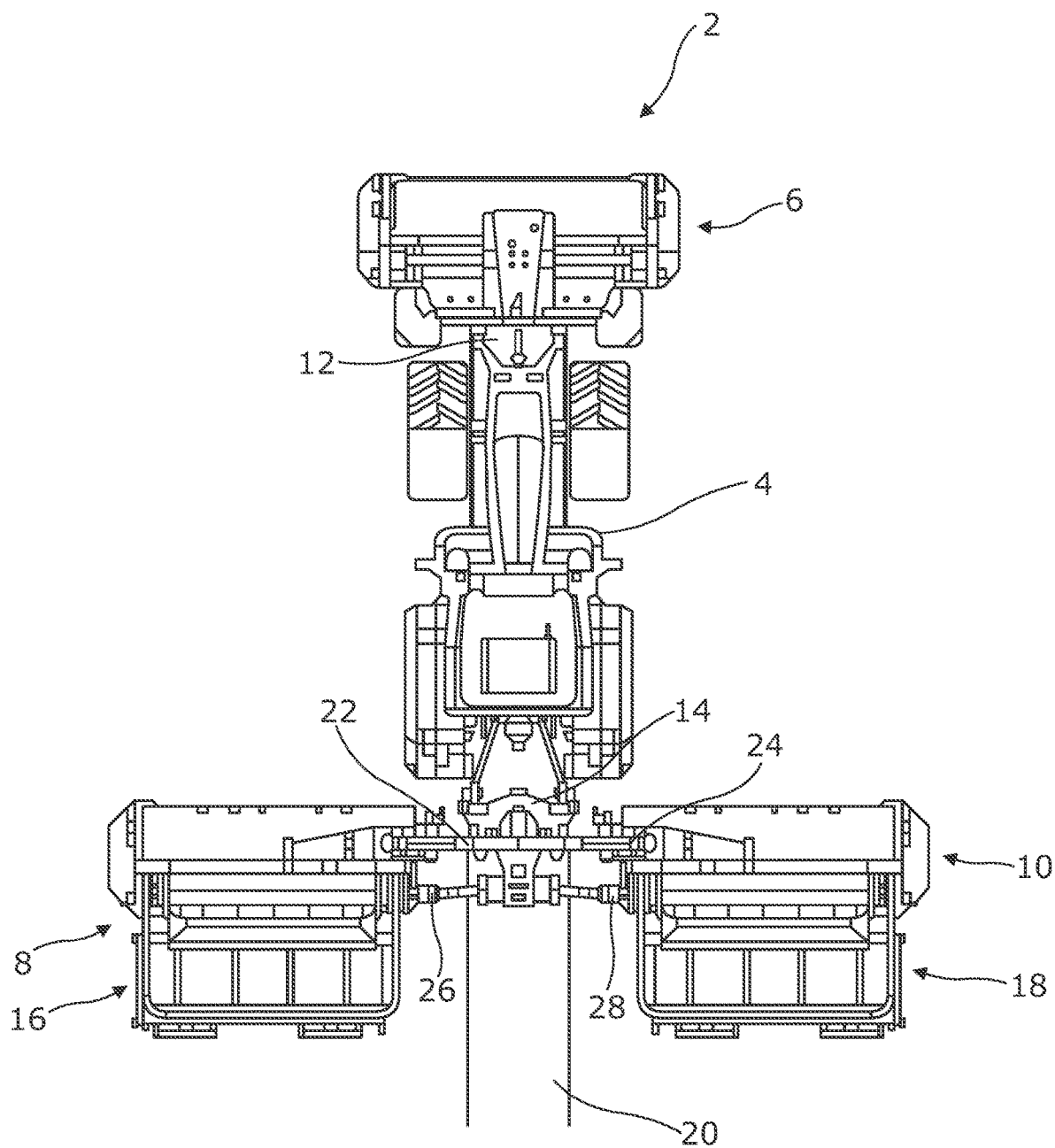
FIG. 1 shows a plan view of a mower combination for use in the present invention.

With reference first to FIG. 1, a plan view of a mower combination 2 for use in the present invention is shown.

A mower combination 2 comprises an agricultural vehicle 4 such as a tractor and a number of mowing units 6,8,10 suitable for cutting a standing crop, such as grass, the mowing units 6,8,10 being connected to the agricultural vehicle. The mowing units include a front mowing unit 6 located to the front of the agricultural vehicle 4 and two lateral mowing units 8,10 located behind and to the sides of the agricultural vehicle 4, each of the mowing units 6,8,10 being adapted to cut the standing crop. The front mowing unit 6 is conveniently mounted on a front hitch 12 of the agricultural vehicle 4. The two lateral mowing units 8,10 are conveniently mounted on a central chassis supported from a rear hitch 14 of the agricultural vehicle 4.

The lateral mowing units 8,10 are supported from a central chassis by hydraulic apparatus 22,24. Each hydraulic unit 22,24 may be used to move a respective lateral mowing unit 8,10 from a working position to a transport position. A headland position may be defined between the working position and the transport position. In the working position the height of each of the lateral mowing units 8,10 above the ground surface may be further controlled by operation of the hydraulic apparatus 22,24. Additional hydraulic units (not shown) may be used to control the lateral displacement of the working position of each lateral mowing unit 8,10.

In the illustrated embodiment of FIG. 1 a swath 20 produced by the front mowing unit 6 is shown. In practice, conveyor units 16,18 mounted to the rear of the lateral mowing units 8,10 are adapted to direct the deposit of cut crop material from each of the lateral mowing units 8,10 to one side or the other of the respective lateral mowing units 8,10 to produce a broader central swath or one or more additional swathes as desired. For clarity, the swathes produced by the lateral mowing units 8,10 are omitted from FIG. 1.

The conveyor units 16,18 are mounted to be displaceable with respect to the lateral mowing units 8,10. The conveyor units 16,18 may be displaced by hydraulic apparatus 26,28 or other suitable apparatus. The conveyor units 16,18 are mounted to be displaced upwards from an active position to an inactive position such that in the inactive position the conveyor units 16,18 do not affect the swath produced by the mowing unit.

The conveyor units 16,18 can comprise conveyor belts or conveyor screws.

Figure 2:
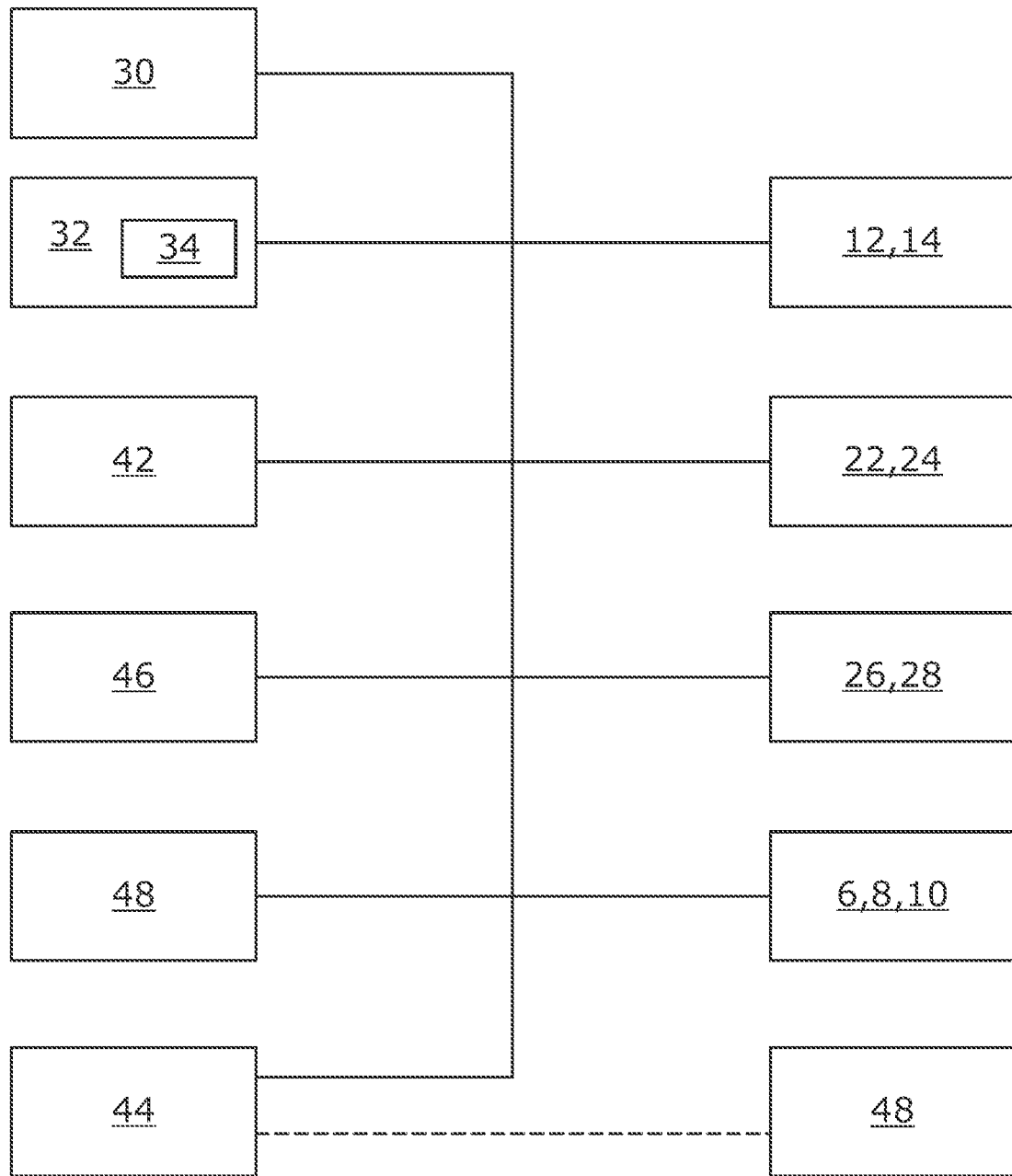
FIG. 2 shows a schematic view of elements of a mower combination for use in the present invention.

An operator can control operation of the front and rear mowing units 6,8,10 from within the agricultural vehicle 4 by use of a suitable user terminal 30 (FIG. 2). For example the operator can control operation of the direction of the conveyor units 16,18 and/or displacement of the conveyor units 16,18, can cause each of the mowing units 6,8,10 to move from a working position to a headland position, can cause the rear mowing units 8,10 to move from the working position to a transport position, or can cause the conveyor units 16,18 to move from an active position to an inactive position. It is an advantage of the present invention that while an operator can control operation of the conveyor units using the user terminal the present invention eliminates or at least substantially reduces the need to do so.

The user terminal 30 communicates with an electronic control unit 32. The control unit 32 may provide signals to control operation of the front and rear hitches 12,14 of the agricultural vehicle 4 and provides signals to control operation of the mowing units 6,8,10 and the conveyor units 16,18. Conveniently the signals are provided by way of a suitable data communication network 40 such as one compliant with the ISOBUS standard (a network in conformance to ISO 11783).

The control unit 32 may conveniently comprise a single processor located on the agricultural vehicle or its functions may be split between a processor located on the agricultural vehicle and one or more additional processors located on the mowing units 6,8,10, the additional processor(s) being in electronic communication with the first processor.

The control unit 32 is also able to access a suitable memory 34. The memory 34 may take any suitable form and is in electronic communication with the control unit 32. The memory 34 is adapted to store, in any suitable manner such as a database or look up table, reference values for a desired direction of operation or lateral displacement of the conveyor units 16,18 with reference to a predetermined track line. The track line and the desired displacement or direction of operation of the conveyor units along the track line can be determined by an operator using the user terminal 30.

The mower combination 2 further comprises a plurality of sensors adapted to provide input signals to be received by the control unit 32.

A position signal 42 representing the location of the mower combination 2 can be provided as a result of information provided by a GPS sensor, or may be known or calculated from existing mapped data together with inputs representing the speed and direction of the of the agricultural vehicle allowing the control unit 32 to determine the position of the mower combination.

In the case of a GPS sensor, it will be understood that a network interface 44 connected to the control unit 32 is provided. The network interface 44 can comprise hardware and/or software that enables wireless connection to one or more remotely located computing devices over a network (e.g., a wireless or mixed wireless and wired network). For instance, the network interface 44 may cooperate with browser software or other software of the control unit 30 to communicate with a server device, enabling remote monitoring or control of the mower combination 2.

The operator may also configure details of the track line and desired swath pattern by way of a remote computing device, such that these details may then downloaded by way of the network interface 44 or otherwise provided to the control unit 32 for storage in the memory 34 before commencing operation of the mower combination.

Alternatively a first set of the predetermined set of values, for example the desired track lines, may be provided by way of a remote computing device, where the operator uses suitable mapping software to produce the desired track lines and a second set of the predetermined set of values, for example the desired swath patterns for production on a particular day, may be entered into the user terminal.

Suitable lateral displacement sensors 46 mounted on the mower combination 2, for example on the mowing units 8,10 can provide input signals representative of the lateral displacement of the mowing units 8,10. The displacement may be measured from any suitable reference point.

Suitable directional sensors 48 mounted on the mower combination 2, for example on the conveyor units 16,18, can provide input signals representative of the direction of operation of each conveyor unit 16,18. A further sensor or sensor 50 mounted, for example, on the conveyor units 16,18 can provide input signals representative of the displacement of each conveyor in either the active or inactive position.

Figure 3:
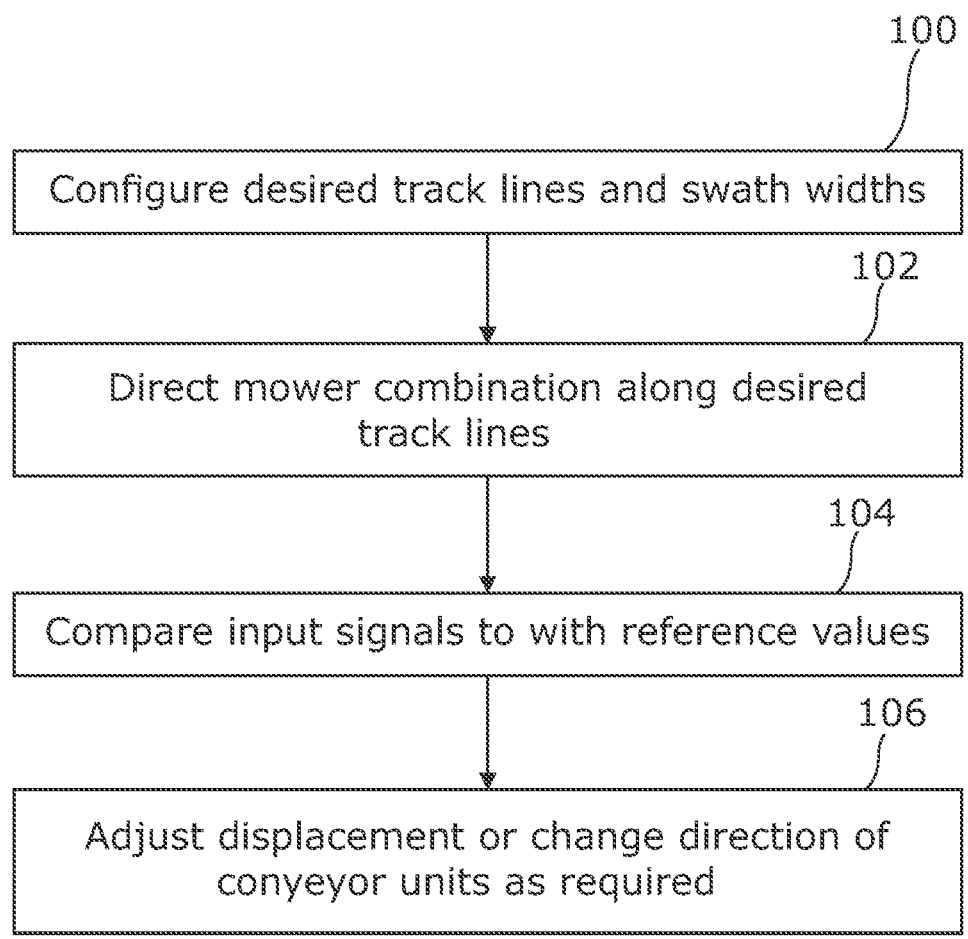
FIG. 3 shows a flow diagram illustrating an example control method for swath formation in accordance with the present invention.

In use, an operator first configures the desired track lines defining the path of the mower combination and swath to be produced (step 100, FIG. 3). The mower combination is then directed along the desired track lines (for example, either driven by a driver following instruction or guidance from the user terminal or directed by an autonomous control system) (step 102). During operation of the mower combination a comparison of the input signals received by the control unit 32 with the reference values stored in the memory 34 takes place (step 104). The control unit 32, as appropriate, then causes a displacement or a change of direction of at least one conveyor unit 16,18 (step 106) such that the desired swath pattern is produced.

Figure 4:
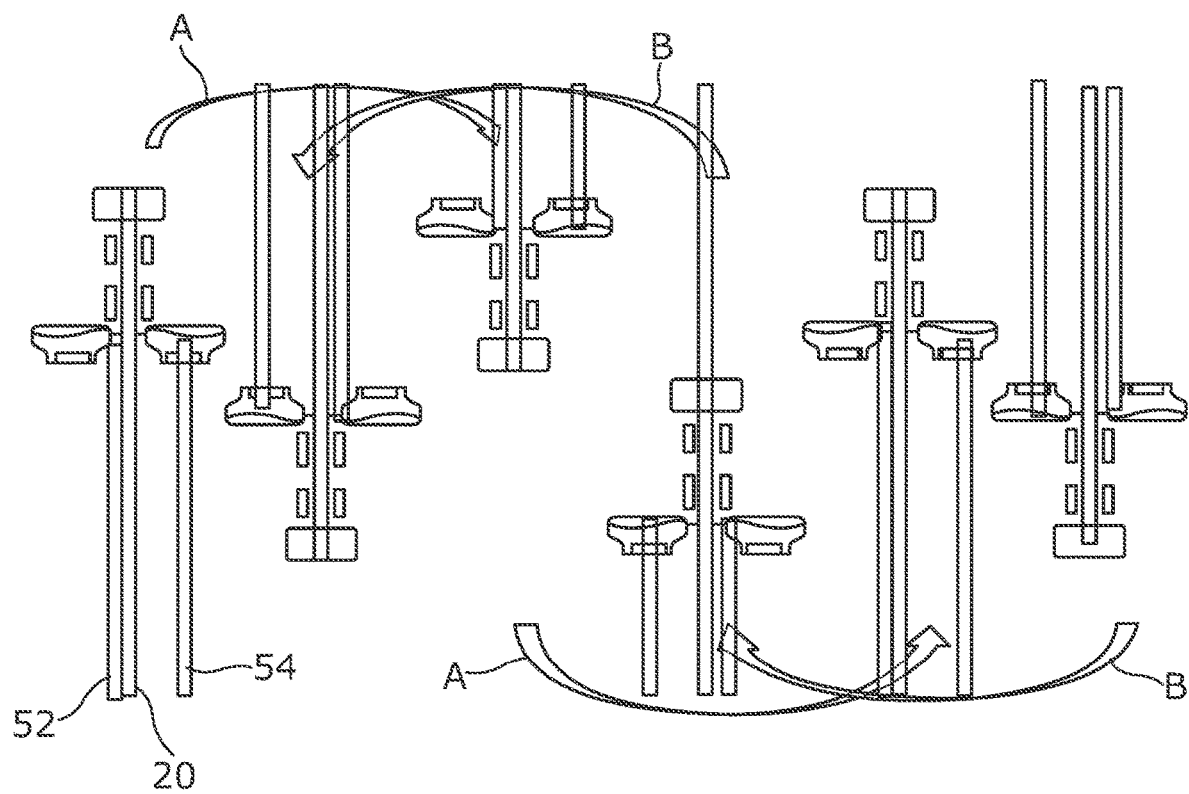
FIG. 4 shows schematically an example generated swath pattern.

In FIG. 4, the path of a single mower combination 2 is shown traversing a field. Firstly the mower combination follows the path indicated by the first set of arrows A (leaving uncut sections of crop between the track lines), and once the width of the field has been traversed, the path indicated by the second set of arrows B is followed (where the uncut sections of crop may be cut). This allows for a relatively shallow turn, minimising maneuvering in the headlands.

In FIG. 4, the conveyor for the left hand mower unit deposits a swath 52 to the right of the conveyor against the swath 20, to create a combined swath of double width. The conveyor of the right hand mower is raised to the inactive position such that a swath 54 in the centre of the mower unit is deposited.

It will be understood that each lateral mower unit can produce three principal swaths: with the conveyor in the inactive position a central swath is produced and with the conveyor in the active position a swath may be generated either to the left or right of the mower unit depending upon the direction of operation of the conveyor unit. Adjustments to these swath positions relative to the central swath produced by the front mower can be made by adjusting the lateral position of each lateral mower unit.

In some embodiments, the control unit 32 may provide feedback of the automatic adjustment of the conveyor units 16,18 to the operator via the user terminal 30, for example visually or audibly.

From reading the present disclosure, other modifications will be apparent to persons skilled in the art. Such modifications may involve other features which are already known in the field of mowers and component parts therefore and which may be used instead of or in addition to features already described herein.

The invention claimed is:

1. A method of operating a mower combination, having an agricultural vehicle and a plurality of mowing units connected to the agricultural vehicle, the plurality of mowing units comprising a front mowing unit and two lateral mowing units located behind and to the sides of the front mowing unit, each one of the lateral mowing units being provided with a conveyor unit to deposit cut crop as a swath, the method comprising:
receiving, at a control unit of the mower combination and from a remote device, operation data representing at least one desired track line and at least one desired swath pattern comprising desired displacements of the conveyor units of the two lateral mowing units along the desired track line;
directing the mower combination at least substantially along the desired track line;
receiving at least one of GPS data, speed data, or direction data of the mower combination;
based on at least one of the GPS data, the speed data, or the direction data, determining a current position of the mower combination along the desired track line;
receiving, at the control unit and from one or more sensors, displacement data of at least one conveyor of the two lateral mowing units representing a current lateral displacement of the at least one conveyor relative to the desired track line and directional data of the at least one conveyor of the two lateral mowing units representing a current direction of operation of the at least one conveyor; and
based at least partially on the determined current position of the mower combination, the displacement data of at least one conveyor, and the directional data of the at least one conveyor, adjusting at least one of the current lateral displacement or the current direction of operation of the at least one conveyor to achieve the desired swath pattern.

2. The method of claim 1, wherein receiving the displacement data and the directional data of the at least one conveyor comprises:
receiving the displacement data from lateral displacement sensors mounted on the two lateral mowing units; and
receiving the directional data from directional sensors mounted on the conveyor units of the two lateral mowing units.

3. The method of claim 1, further comprising adjusting a vertical position of at least one lateral mowing unit above the ground to move the at least one lateral mowing unit from an active position to an inactive position or from an inactive position to an active position.

4. The method of claim 3, where adjusting the vertical position of the at least one lateral mowing unit above the ground comprises moving the at least one lateral mowing unit downward to move the at least one lateral mowing unit from the inactive position to the active position.

5. The method of claim 3, where adjusting the vertical position of the at least one lateral mowing unit above the ground comprises moving the at least one lateral mowing unit upward to move the at least one lateral mowing unit from the active position to the inactive position.

6. The method of claim 1, wherein adjusting the current lateral displacement of the at least one conveyor comprises changing a position at which the at least one conveyor generates a swath from a first position along a transverse axis orthogonal to a longitudinal axis of the agricultural vehicle to a second position along the transverse axis.

7. The method of claim 6, wherein the first position is more proximate the longitudinal axis of the agricultural vehicle than the second position.

8. The method of claim 6, wherein the second position is more proximate the longitudinal axis of the agricultural vehicle than the first position.

* * * * *